(12) United States Patent
Sugiyama

(10) Patent No.: US 8,164,230 B2
(45) Date of Patent: Apr. 24, 2012

(54) STATOR

(75) Inventor: Toshiya Sugiyama, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 361 days.

(21) Appl. No.: 12/550,932

(22) Filed: Aug. 31, 2009

(65) Prior Publication Data

US 2010/0060099 A1    Mar. 11, 2010

(30) Foreign Application Priority Data

Sep. 9, 2008   (JP) ................................ 2008-230445

(51) Int. Cl.
*H02K 1/18* (2006.01)
(52) U.S. Cl. .... 310/216.008; 310/216.004; 310/216.009
(58) Field of Classification Search ............. 310/216.01, 310/216.08, 216.009
See application file for complete search history.

(56) References Cited

U.S. PATENT DOCUMENTS

| | | | | |
|---|---|---|---|---|
| 5,729,072 A | * | 3/1998 | Hirano et al. | 310/216.009 |
| 6,919,665 B2 | * | 7/2005 | Murakami et al. | 310/216.043 |
| 6,975,057 B2 | * | 12/2005 | Gauthier et al. | 310/216.095 |
| 7,348,706 B2 | * | 3/2008 | Ionel et al. | 310/216.009 |
| 7,378,774 B2 | * | 5/2008 | Torii et al. | 310/216.041 |
| 7,595,578 B2 | * | 9/2009 | Aramaki et al. | 336/130 |
| 7,872,391 B2 | * | 1/2011 | Lim | 310/216.043 |
| 2005/0073211 A1 | * | 4/2005 | Lee | 310/216 |

FOREIGN PATENT DOCUMENTS

| | | | |
|---|---|---|---|
| JP | 2003-052138 | * | 2/2003 |
| JP | 2004-23899 | * | 1/2004 |
| JP | 2006-158003 | * | 6/2006 |
| JP | 2007-129835 A | | 5/2007 |
| JP | 2008-113529 | * | 5/2008 |

* cited by examiner

*Primary Examiner* — Burton Mullins
(74) *Attorney, Agent, or Firm* — Buchanan Ingersoll & Rooney PC

(57) ABSTRACT

A stator includes a core holder and a stator core configured by split cores arranged so as to form the annular shape, and press-fitted into the core holder. Each of the split cores is configured so that a plurality of metal plates is layered and fixed to each other by dowel-fastening. Each of the split cores includes an outer circumference groove portion and a dowel-fastening portion, the outer circumference groove portion being formed at a portion of an outer circumferential surface of the split core radially outer than the dowel-fastening portion so as to be recessed in a radially inward direction of the stator core to include a predetermined depth.

9 Claims, 4 Drawing Sheets

FIG. 3B  IIIB-IIIB

STATOR

CROSS REFERENCE TO RELATED APPLICATIONS

This application is based on and claims priority under 35 U.S.C. §119 to Japanese Patent Application 2008-230445, filed on Sep. 9, 2008, the entire contents of which is incorporated herein by reference.

TECHNICAL FIELD

This disclosure relates to a stator of a motor.

BACKGROUND

Generally, a stator of a motor is configured so that coils are respectively wound to form a plurality of layers around teeth portions, which are formed to protrude from corresponding yoke portions of stator cores in a radially inward direction of the motor. A large-sized stator core is used in a stator of a motor mounted on a vehicle, such as a hybrid vehicle and the like. The large-sized stator core, which is integrally formed, may cause a decrease of a yield rate of a material. Therefore, a splitable stator core is used, in which split cores are split at the yoke portions on the basis of each of the teeth portions. A stator having the splitable stator core is disclosed in the following.

According to JP2007-129835A, a stator core is configured with split cores, which are split at yoke portions in a direction crossing a circumferential direction of a motor. When the split cores are arranged so as to entirely form the annular shape, in split surfaces at which adjacent split cores contact each other, portions of the split surfaces in the vicinity of a rotor, rotated relative to an inner circumference of the stator core, contact each other preferentially. More specifically, in a state where the split cores are arranged so as to entirely form the annular shape, and where the split cores are integrally held, receiving pressure from an outer circumference of the stator core, the portions of split surfaces of the split cores in the vicinity of the rotor contact each other with a higher pressure than a pressure between other portions of the split surfaces being distant from the rotor. Further, the split cores are configured in a manner where a plurality of metal plates is layered. In general, considering assembly at the time of production, the metal plates are fixed to each other by dowel-fastening.

A position for dowel-fastening is set in the vicinity of an outer circumference of the yoke portions of the split cores, in order to reduce deterioration of motor performance. Due to the dowel-fastening, radially outer portions of the dowel-fastening portion of the split cores slightly expand in a radially outward direction of the motor. Further, when the stator core, in which the split cores are arranged so as to entirely form the annular shape, is press-fitted into a core holder, the dowel-fastening portions may expand because inner pressure occurs between the split cores in the circumferential direction of the motor. In a case where the stator core, having the expanded split cores, is press-fitted into the core holder, an outer circumferential portion of the stator core may contact the core holder partially because the dowel-fastening portions and the outer portions of the dowel fastening portions are expanded. As a result, a burr may occur and a holding force may decrease.

A need thus exists for a stator that is not susceptible to the drawback mentioned above.

SUMMARY

According to an aspect of this disclosure, a stator includes a core holder; and a stator core configured by split cores arranged so as to form the annular shape, and press-fitted into the core holder. Each of the split cores is configured so that a plurality of metal plates is layered and fixed to each other by dowel-fastening. Each of the split cores includes an outer circumference groove portion and a dowel-fastening portion, the outer circumference groove portion being formed at a portion of an outer circumferential surface of the split core radially outer than the dowel-fastening portion so as to be recessed in a radially inward direction of the stator core to include a predetermined depth.

BRIEF DESCRIPTION OF THE DRAWINGS

The foregoing and additional features and characteristics of this disclosure will become more apparent from the following detailed description considered with the reference to the accompanying drawings, wherein:

FIG. 3B is an enlarged cross-sectional view taken along line IIIB-IIIB in FIG. 3A according to the embodiment;

DETAILED DESCRIPTION

Figure 1:
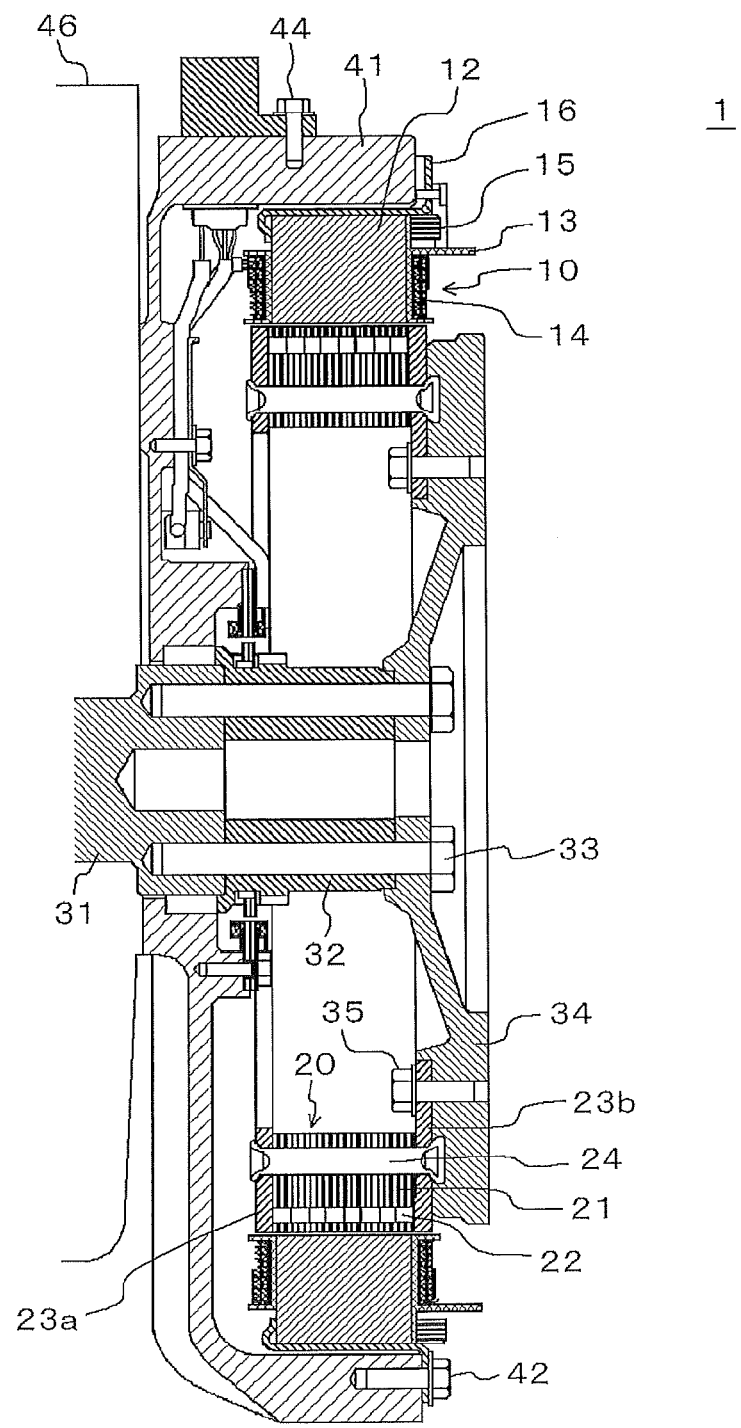
FIG. 1 is a cross-sectional view schematically illustrating a configuration of a motor in which a stator core is applied according to an embodiment.
Figure 2:
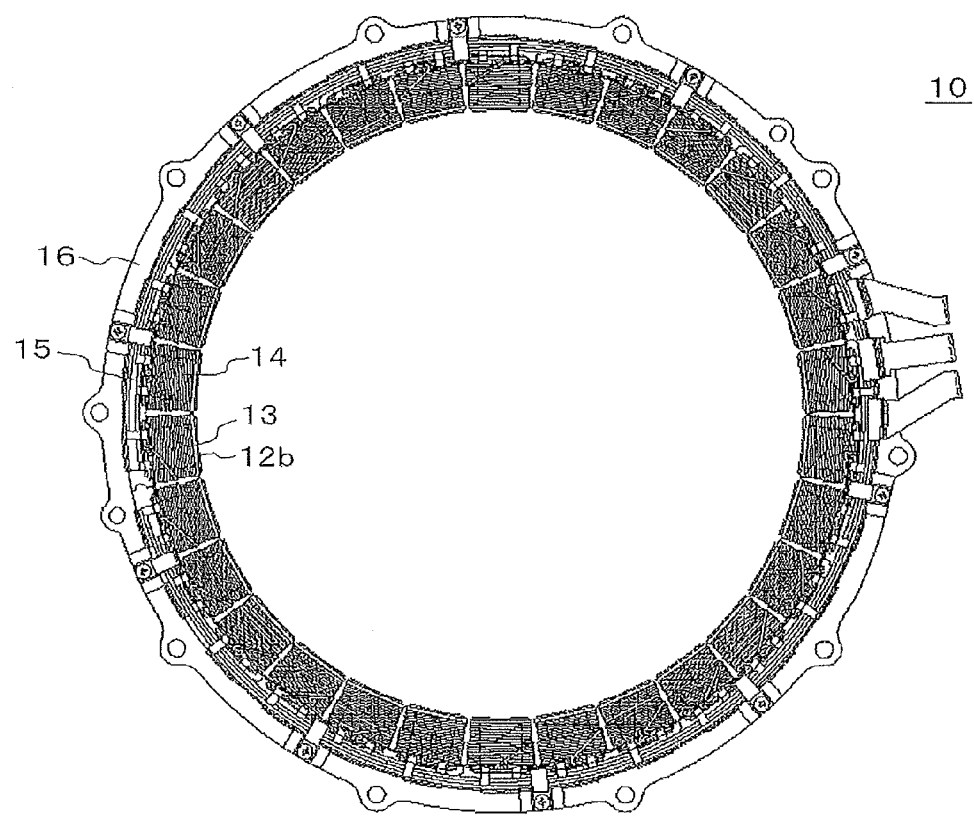
FIG. 2 is a front view schematically illustrating a configuration of a stator when seen in an axial direction according to the embodiment.
Figure 3A:
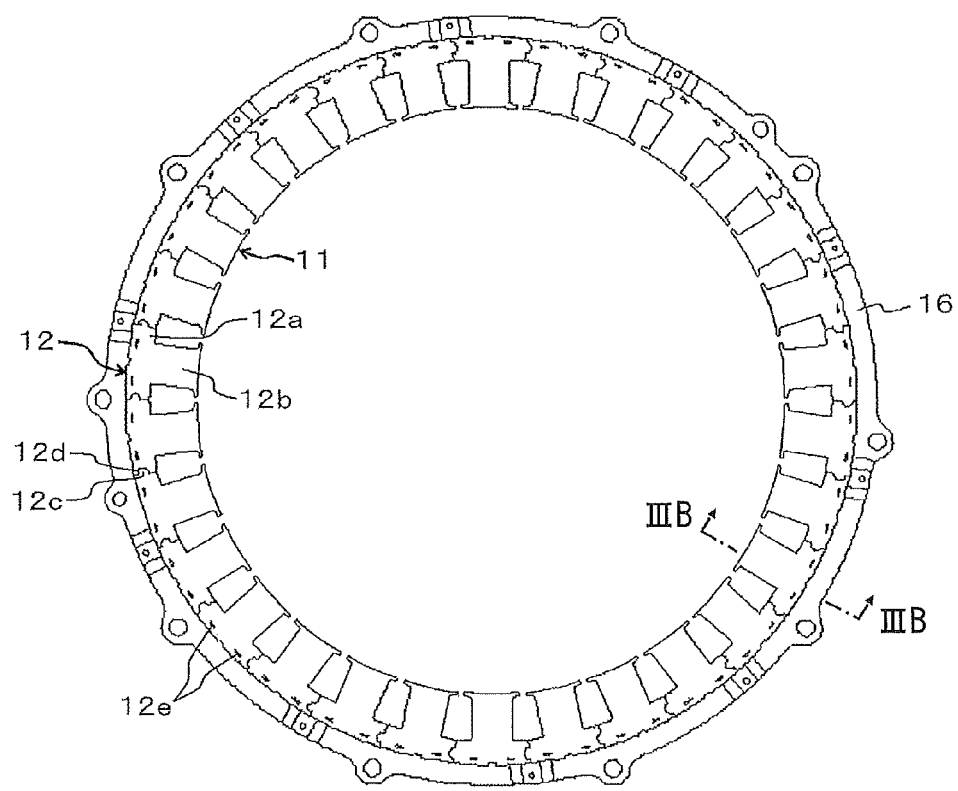
FIG. 3A is a planar view illustrating a configuration of an assembly body of the stator core and a core holder of the stator when seen in the axial direction according to the embodiment.
Figure 3A:
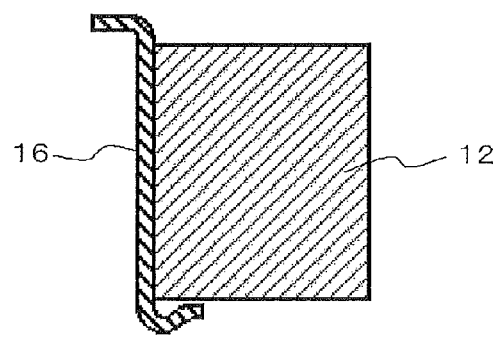
Figure 4A:
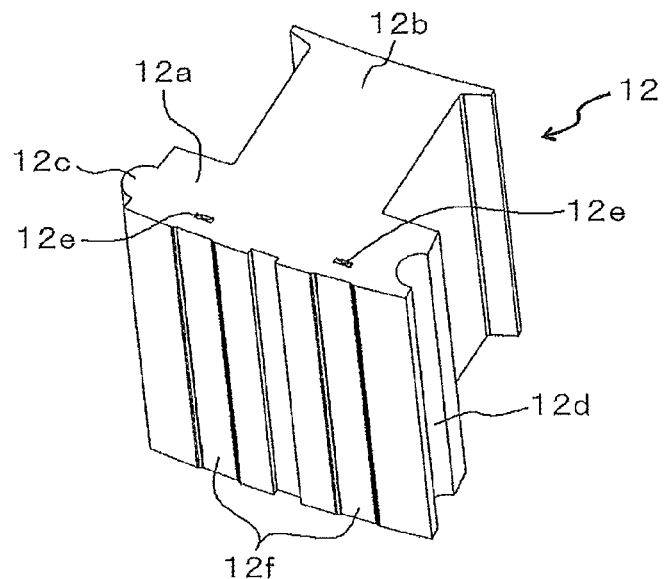
FIG. 4A is a perspective view schematically illustrating a configuration of a split core of the stator according to the embodiment.
Figure 4B:
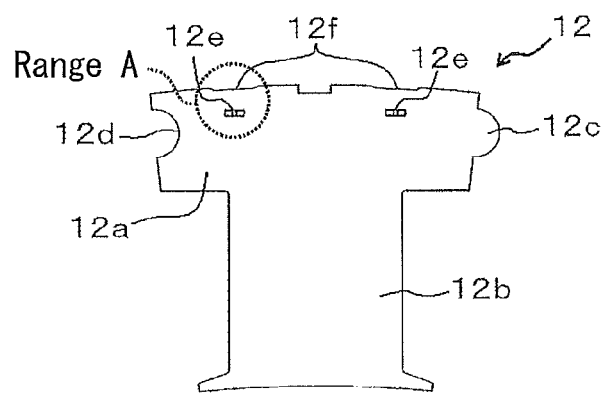
FIG. 4B is a planar view schematically illustrating the configuration of the split core of the stator according to the embodiment.
Figure 4C:
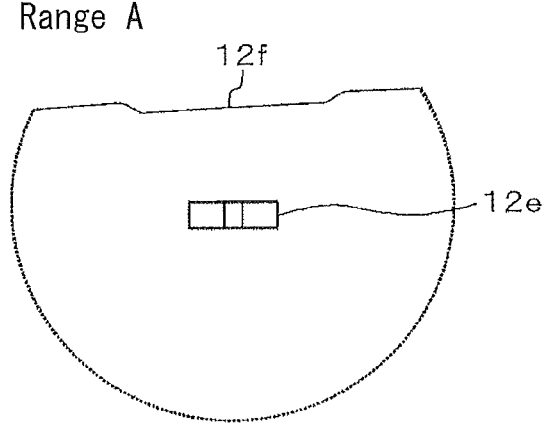
FIG. 4C is a partially-enlarged planar view schematically illustrating a dowel-fastening portion, enlarging range A in FIG. 4B, according to the embodiment.

A stator 10 includes a core holder 16 and a stator core 11 configured by split cores 12 arranged so as to form the annular shape, and press-fitted into the core holder 16. Each of the split cores 12 is configured so that a plurality of metal plates is layered and fixed to each other by dowel-fastening. Each of the split cores 12 includes an outer circumference groove portion 12 and a dowel-fastening portion 12e, the outer circumference groove portion 12f being formed at a portion of an outer circumferential surface of the split core 12 radially outer than the dowel-fastening portion 12e so as to be recessed in a radially inward direction of the stator core 11 to include a predetermined depth.

An embodiment of the stator 10 will be described hereinafter with reference to the attached drawings. A "circumferential direction" and a "radial direction" mentioned hereinafter correspond to a circumferential direction and a radial direction of a motor 1.

As illustrated in FIG. 1, the motor 1 is a brushless motor. The motor 1 includes the stator 10 and a rotor 20.

The stator 10 is formed into a substantially annular shape and a substantially cylindrical shape. The stator 10 includes the stator core 11, insulating members 13, coils 14, bus rings 15 and a core holder 16 (see FIGS. 1 to 4C).

The stator core 11 is configured in a manner where a plurality of split cores 12, which are split from each other in the radial direction at yoke portions 12a on the basis of each teeth portion 12b, is assembled to each other so as to entirely form the annular shape, and the plurality of the split cores 12 are then press-fitted into the core holder 16.

Each of the split cores 12 includes the teeth portion 12b and the yoke portion 12a. Each of the teeth portions 12b protrudes from an inner circumferential surface of the yoke portion 12a in a radially inward direction. Each of the yoke portions 12a includes a protruding portion 12c and a recessed portion 12d at end portions of the yoke portion 12a in a circumferential direction thereof. The split cores 12 are positioned in a manner where each of the split cores 12 is combined with adjacent split cores 12 by an engagement between the protruding portions 12c and the recessed portions 12d. Each of the protruding portions 12c is formed in an arc shape and each of the recessed portions 12d is also formed in arc shape, which is engageable with the arc shape of the protruding portion 12c, so that roundness of an outer circumference of the stator core 11 is achieved when the split cores 12 are arranged to entirely form the annular shape. Further, when the protruding portions 12c and the recessed portions 12d are formed in the arc shapes, dimensions, in which the protruding portions 12c face the corresponding recessed portions 12d, are increased, and therefore magnetic resistance is decreased. In split surfaces, at which the split cores 12 are split from each other, a radially inner portion and a radially outer portion of each of the split surfaces, except the protruding portion 12c and the recessed portion 12d, are formed into a planar shape. Each of the split cores 12 receives pressure from the core holder 16 in the radially inward direction. Because of the pressure from the core holder 16, the split cores 12 contact each other at the split surfaces thereof so as to tightly hold each other in the circumferential direction, and thereby the split cores 12 are integrally fixed.

Each of the split cores 12 is configured so that a plurality of metal plates is layered. Considering assembly at the time of production, the metal plates are dowel-fastened so that the plurality of the metal plates is fixed to each other. "Dowel-fastening" mentioned hereinafter describes the following: a second metal plate is arranged on the top of a first metal plate. In such a state, the second metal plate is punched toward a hole (recessed portion) generated on the first metal plate, so that a projection generated on the second metal plate is engaged with the hole (the recessed portion) of the first metal plate. Accordingly, the second metal plate is press-fitted into the first metal plate. According to the embodiment, two dowel-fastening portions 12e are provided at each of the yoke portions 12a of the split cores 12 to be in the vicinity of outer circumferential surface of the yoke portion 12a, in order to reduce motor performance deterioration. Each of the split cores 12 includes two outer circumference groove portions 12f. The two outer circumference groove portions 12f are formed at portions of the outer circumferential surface of each of the yoke portions 12a outer than the dowel-fastening portions 12e in the radial direction. Each of the outer circumference groove portions 12f is formed in a predetermined depth in a radially inward direction of the stator core 11. Each of the outer circumference groove portions 12f is formed in a width, which overlaps with the dowel-fastening portion 12e in the circumferential direction. Further, each of the outer circumference groove portions 12f is formed to extend in the axial direction of the stator core 11 along a direction, to which the dowel-fastening portion 12e of the split core 12 extends. When the split cores 12 are dowel-fastened, each of the yoke portions 12a slightly expands toward the radially outward direction, and the depth of the outer circumference groove portions 12f is set so as to compensate an amount of the expansion. In other words, the depth of each of the outer circumference groove portions 12f is set so that a bottom surface thereof does not reach the level of the outer circumferential surface of the yoke portion 12a.

The insulating members 13, formed in a substantially bobbin shape, are respectively arranged at the teeth portions 12b of the stator core 11. The insulating members 13 insulate the coils 14, the stator core 11 and the bus rings 15.

The coils 14 are made of wire rod, which includes insulating coating on a surface thereof. Each of the coils 14 is configured in a manner where the wire rod is wound around an outer circumference of the insulating member 13 arranged at the stator core 11. End portions of each of the coils 14 are pulled out so as to connect to the corresponding bus rings 15 electrically and mechanically.

The bus rings 15, formed into a ring-shape, are a conductive member connected to the corresponding coils 14. The bus rings 15 are arranged in the vicinity of an outer circumference of the coils 14. The bus rings 15 are fitted into the corresponding insulating members 13 from the axial direction of the motor 1 so as to be fixed thereto. The bus rings 15 include a plurality of rings, which are insulated from each other. Each of the rings is electrically connected to a connector, which is provided at an outside portion of a motor cover 41, via wirings.

The core holder 16, formed into a substantially ring-shape, supports the stator core 11, in which the plurality of the split cores 12 are assembled to each other so as to entirely form the annular shape, from the outer circumference of the motor 1 and from one side of the axial direction of the motor 1. The core holder 16 is fixed to the motor cover 41 by means of first bolts 42. The motor cover 41 is fixed at an engine housing 46 by means of bolts. The connector is fixed at the motor cover 41 at the outside portion thereof by means of second bolts 44.

The rotor 20 is an inner rotor arranged in the vicinity of an inner circumference of the stator 10 with a predetermined interval therebetween. A permanent magnet 22 is embedded into a rotor core 21. The rotor core 21 is sandwiched between a first end plate 23a and a second end plate 23b. The first and second end plates 23a and 23b are fixed to each other by means of fixing pins 24, which extend through the rotor core 21. The second end plate 23b is fixed at a wheel member 34 by means of third bolts 35. The wheel member 34 is fixed to a crank shaft 31 of an engine via shafts 32 by means of fourth bolts 33.

A motor, which is used in a hybrid vehicle, is shown in FIGS. 1 to 4C, though the embodiment is not limited to be applied to such a motor.

According to the embodiment, the outer circumference groove portions 12f are formed at the portions of the outer circumferential surface of the yoke portions 12a outer than the dowel-fastening portions 12e in the radial direction. Therefore, even when the split cores 12 expand at the time when the dowel-fastening portions 12e are connected to each other, and even when the split cores 12 expand due to the inner pressure in the circumferential direction at the time when the split cores 12 are arranged so as to entirely form the annular shape, the amount of the expansion are compensated at the outer circumference groove portions 12f. As a result, the outer circumference groove portions 12f expands so as not to protrude beyond the outer circumferential surface of the yoke portions 12a. Accordingly, when the stator core 11, in which the split cores 12 are arranged so as to entirely form the annular shape, is press-fitted into the core holder 16, the portions of the outer circumferential surface of the yoke portions 12a radially outer than the dowel-fastening portions 12e, may not partially contact the core holder 16. A holding force is increased because contacting dimensions between the core holder 16 and the stator core 11 are sufficiently obtained. Accordingly, a burr may not occur at the outer circumferential surface of the yoke portions 12a.

According to the embodiment, each of the split cores 12 includes the teeth portion 12b protruding from the inner circumferential surface of the yoke portion 12a in the radially inward direction of the stator core 11, the dowel-fastening portion 12e is formed in the vicinity of an outer circumferential surface of the yoke portion 12a, and the outer circumference groove portion 12f is formed at the outer circumferential surface of the yoke portion 12a to overlap with the dowel-fastening portion 12e.

According to the embodiment, each of the split cores 12 contacts adjacent split cores 12 at end surfaces of the yoke portion 12a in a circumferential direction thereof.

According to the embodiment, the outer circumference groove portion 12f is formed to extend in an axial direction of the stator core 11 along a direction, to which the dowel-fastening portion 12e of the split cores 12 extends.

According to the embodiment, each of the split cores 12 is combined with adjacent split cores 12 by an engagement between a protruding portion 12c and a recessed portion 12d, each of which is formed at end portions of the yoke portion 12a in the circumferential direction thereof.

According to the embodiment, the protruding portion 12c and the recessed portion 12d are formed into arc shapes, which are engageable with each other, so that roundness of an outer circumference of the stator core 11 is achieved when the split cores 12 are arranged in the annular shape.

According to the embodiment, a radially inner portion and a radially outer portion of a split surface of each of the split cores 12 except the protruding portion 12c and the recessed portion 12d are formed into a planar shape.

According to the embodiment, the dowel-fastening means that a second metal plate is arranged on the top of a first metal plate, in such a state, the second metal plate is punched toward a hole or a recessed portion generated on the first metal plate, so that a projection generated on the second metal plate is engaged with the hole or the recessed portion of the first metal plate, and that the second metal plate is press-fitted into the first metal plate.

According to the embodiment, the outer circumference groove portions 12f are formed at the portions of the outer circumferential surface of the yoke portions 12a outer than the dowel-fastening portions 12e in the radial direction. Therefore, even when the split cores 12 expand at the time when the dowel-fastening portions 12e are connected to each other, and even when the split cores 12 expand due to the inner pressure in the circumferential direction at the time when the split cores 12 are arranged so as to entirely form the annular shape, the amount of the expansion are compensated at the outer circumference groove portions 12f. As a result, the outer circumference groove portions 12f expands so as not to protrude beyond the outer circumferential surface of the yoke portions 12a. Accordingly, when the stator core 11, in which the split cores 12 are arranged so as to entirely form the annular shape, is press-fitted into the core holder 16, the portions of the outer circumferential surface of the yoke portions 12a radially outer than the dowel-fastening portions 12e, may not partially contact the core holder 16. A holding force is increased because contacting dimensions between the core holder 16 and the stator core 11 are sufficiently obtained. Accordingly, a burr may not occur at the outer circumferential surface of the yoke portions 12a.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A stator comprising:
a core holder; and
a stator core configured by split cores arranged so as to form the annular shape, and press-fitted into the core holder; wherein
each of the split cores is configured so that a plurality of metal plates is layered and fixed to each other by dowel-fastening, and wherein
each of the split cores includes an outer circumference groove portion and a dowel-fastening portion, the outer circumference groove portion being formed at a portion of an outer circumferential surface of the split core radially outer than the dowel-fastening portion so as to be recessed in a radially inward direction of the stator core to include a predetermined depth;
each of the split cores includes a teeth portion protruding from an inner circumferential surface of a yoke portion in the radially inward direction of the stator core,
the dowel-fastening portion is formed in the vicinity of an outer circumferential surface of the yoke portion, and
the outer circumference groove portion is formed at the outer circumferential surface of the yoke portion to overlap with the dowel-fastening portion.

2. The stator according to claim 1, wherein
each of the split cores contacts adjacent split cores at end surfaces of the yoke portion in a circumferential direction thereof.

3. The stator according to claim 2, wherein
the outer circumference groove portion is formed to extend in an axial direction of the stator core along a direction, to which the dowel-fastening portion of the split cores extends.

4. The stator according to claim 2, wherein
each of the split cores is combined with adjacent split cores by an engagement between a protruding portion and a recessed portion, each of which is formed at end portions of the yoke portion in the circumferential direction thereof.

5. The stator according to claim 4, wherein
the protruding portion and the recessed portion are formed into arc shapes, which are engageable with each other, so that roundness of an outer circumference of the stator core is achieved when the split cores are arranged in the annular shape.

6. The stator according to claim 5, wherein
a radially inner portion and a radially outer portion of a split surface of each of the split cores except the protruding portion and the recessed portion are formed into a planar shape.

7. The stator according to claim 4, wherein
a radially inner portion and a radially outer portion of a split surface of each of the split cores except the protruding portion and the recessed portion are formed into a planar shape.

8. The stator according to claim 1, wherein
the outer circumference groove portion is formed to extend in an axial direction of the stator core along a direction, to which the dowel-fastening portion of the split cores extends.

9. The stator according to claim 1, wherein
the dowel-fastening means that a second metal plate is arranged on the top of a first metal plate,
in such a state, the second metal plate is punched toward a hole or a recessed portion generated on the first metal plate, so that a projection generated on the second metal plate is engaged with the hole or the recessed portion of the first metal plate, and that
the second metal plate is press-fitted into the first metal plate.

* * * * *